United States Patent [19]
Fitzgerald

[11] 3,753,346
[45] Aug. 21, 1973

[54] FLUID MONITORING UNIT

[75] Inventor: William M. B. Fitzgerald, Toronto, Ontario, Canada

[73] Assignee: Johnson, Mathey and Mallory, Ltd., Toronto, Canada

[22] Filed: Nov. 24, 1970

[21] Appl. No.: 92,515

Related U.S. Application Data

[60] Division of Ser. No. 786,971, Dec. 26, 1968, Pat. No. 3,634,934, which is a continuation-in-part of Ser. No. 507,173, Nov. 10, 1965, abandoned.

[52] U.S. Cl............................................. 60/54.6 R
[51] Int. Cl.............................................. F15b 7/00
[58] Field of Search..................... 60/54.5 E, 54.6 E, 60/54.6 R

[56] References Cited
UNITED STATES PATENTS
2,095,560  10/1937  Vickers............................ 60/54.5 E
1,578,824  3/1926  Herbst et al...................... 60/54.5 E FOREIGN PATENTS OR APPLICATIONS
237,116  10/1960  Australia......................... 60/54.6 E Primary Examiner—Martin P. Schwadron
Assistant Examiner—A. M. Zupcic
Attorney—Richards H. Childress, Robert F. Meyer and Henry W. Cummings

[57] ABSTRACT

A volume of fluid emanating from a cavity is regulated through a parallel conduit, pressurized system.

1 Claim, 1 Drawing Figure

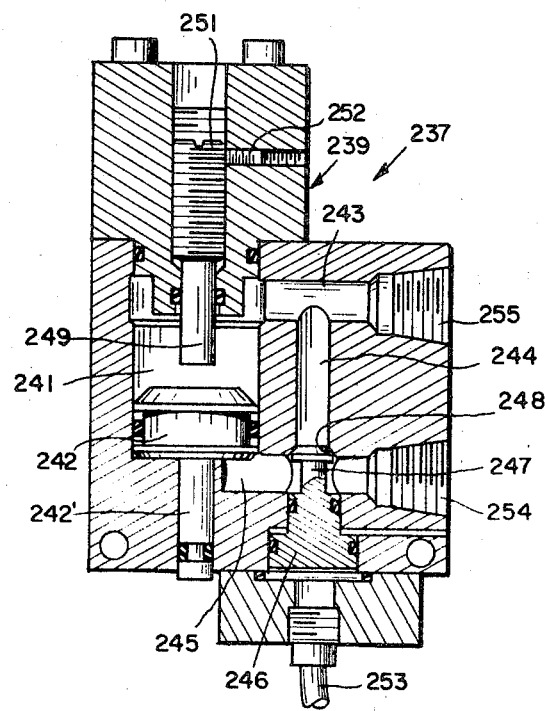

FLUID MONITORING UNIT

This is a division of application Ser. No. 786,971, filed Dec. 26, 1968, now U.S. Pat. No. 3,634,934 which was a continuation-in-part of application Ser. No. 507,173 filed Nov. 10, 1965, now abandoned.

This invention relates to an improved method of welding a metal facing to a base metal to form a composite headed contact, and to a machine for carrying out such method. The method of the present invention is particularly applicable to making rivet type composites having the shank and part of the head thereof fabricated from one metal and the face thereof having a layer of another metal or an alloy of the metal. It is also believed that the present invention would be applicable to tri-metal composites wherein a layer of one metal is sandwiched between other metals or alloys of metals.

In the manufacture of electrical contacts, use is being frequently made of composite contacts wherein the contacts are manufactured of a low cost base metal and a relatively higher cost material for the electrical contact material. For example, composite rivet type electrical contacts are manufactured wherein the shank of the rivet and part of the head are manufactured from a good thermally and electrically conductive material such as copper, aluminum, and magnesium with the face of the head being fabricated from a material which is also electrically and thermally conductive and is also resistant to oxidation such as silver or silver-cadmium oxide.

Because of the rising prices of materials such as silver, such composite contacts are being more abundantly used. Consequently, industry is constantly seeking means and methods for making such contacts. Among the problems associated with the making of such contacts is that of achieving a good uniform contact face on the head with a good bond between the contact face and the base metal. Such problems become particularly acute with regard to the use of silver-cadmium oxide as the contact face material. Silver-cadmium oxide becomes increasingly difficult to bond to the base metal, such as copper, as the amount of cadmium oxide increases.

Furthermore, in order to take advantage of the lower cost materials, the composite contacts must, of necessity, be made at high production rates with good quality and with close tolerances.

The present invention is concerned with the fabrication of composite articles of manufacture, more particularly, composite rivet type contacts, and has as one of its objects the provision of a method of producing such articles.

Another object is the provision of a method of welding such articles wherein a facing is formed as part of the head of a rivet type article with the facing being joined to a base metal and then subsequently headed to form the final article Still another object of the invention is the provision of such a method wherein a uniform layer of such facing is achieved.

Yet another object of the invention is the provision of such a method wherein the layer being joined to the base metal is formed with a greater thickness at the periphery prior to the heading step.

Still another object of the invention is the provision of such a method wherein the base metal and the facing metal is heated prior to joining.

A further object of the invention is the provision of such a method wherein the temperature of the base metal and the facing metal is regulated to achieve a desired facing configuration.

Still another object of the invention is to provide such a method wherein the welding is achieved through rapid impact of pressure.

Another object of the invention is to provide such a method wherein the ends of wire of predetermined length are welded together.

A further object of the invention is to provide such a method wherein there is substantially no flow of the metals at the joint when the wires are joined.

Another object of the invention is the provision of such a method which is carried out in a vacuum.

Yet another object of the invention is the provision of a machine for making the article.

A further object of the invention is the provision of a machine for making the article at a high production rate.

Another object of the invention is to provide such a machine which is hydraulically operated in accordance with a programmed sequence.

Still another object of the invention is the provision of such a machine wherein there are means to heat, cut and feed wire stock to a centrally located work station.

Another object of the invention is to provide such a machine wherein the work station includes axial positioning means and support means.

Another object of the invention is to provide such a machine wherein hydraulic fluid is fed to various elements of the machine through an actuator means energized by a hydraulic programmer coupled to the actuator.

Another object of the invention is to provide an actuator means including a chamber of fluid under pressure, passages communicating with an element of the machine to be actuated, and means controlling the fluid to the passages.

Another object of the invention is to provide a hydraulic programmer including a chamber of fluid under pressure, outlet means communicating with the chamber, and programming means selectively opening and closing the outlet means.

Yet another object of the invention is to provide such a machine wherein an impact means is rapidly moved through a lever system to force predetermined lengths of wire into a support means and to join the wires by impact in a single continuous stroke.

Still another object of the invention is the provision of a wire feed means utilizing a piston arrangement for selectively feeding wire.

Another object of the invention is the provision of a ram means utilizing a travel multiplier means.

Another object of the invention is to provide a hydraulic valve means to control the volume of fluid to an element being actuated.

Another object of the invention is to provide a hydraulic valve means to control the pressure of a fluid to an element being actuated.

These and other objects and the nature thereof will become apparent from the following description taken in conjunction with the accompanying drawing wherein the sole FIGURE is a cross section of a valve means.

While the invention will be described with reference to the manufacture of electrical contacts, it should be understood that the invention need not be so limited and that the purpose of the invention is to produce composite articles having a head and a shank wherein the head is composed of different materials.

According to the present invention, the metals comprising the electrical contact are cut from continuous lengths of wire and then immediately transferred to a centrally disposed work station where the metals are joined by pressing them together quickly at high pressure. The process is completed at the same work station by forming the welded metals under pressure into a rivet or composite disc. One or more of the metals may be heated to assist in the joining process. All the operations may be carried out in a vacuum or in a protective atmosphere to ensure uncontaminated and oxide-free joints between the several metals of the contact.

According to a further feature of the present invention, the operations of uncoiling the wires, straightening the wires when necessary, shearing the wires into accurate lengths, heating one or more of the lengths of wire, joining several of the lengths of wire and forming the resulting composite rod to the required final shape are performed simultaneously and successively according to a repeating sequence in the same machine.

According to still further features of the present invention, the operation of welding, indenting the shank when required and forming the composite rod into the required final shape are all performed while the rod is in or partly in the confines of the work station. For this purpose the work station is mounted in a central position on a horizontal slab of metal and various tools are placed radially around the die. Means are provided to advance each tool to a position over the die. The tool performs its required function on the composite rod and then is withdrawn to make way for the next operation. Suitable means are provided to cool the die and the various tools surrounding it. Power for performing the function of each tool is provided by an overhead ram means mounted on the same axis as the work station. The ram means is propelled downwards along the axis of the station at high velocity to successively actuate the tools which perform the operations of welding and forming the contact.

In carrying out the process of the invention, wires of a predetermined length of electrically and thermally conductive and oxidation resistant material taken from the group consisting of silver, silver-cadmium oxide, gold, platinum, paladium, and alloys thereof, is molecularly bonded to a wire of a predetermined length of an electrically and thermally conductive metal taken from the group consisting of copper, aluminum, magnesium, steel and alloys thereof to form a composite rod and the the composite rod is headed to form a rivet type article. The materials are molecularly bonded together very rapidly such that the material's grain structure is undamaged. A uniform layer of the electrically and thermally conductive and oxidation resistant material may be assisted by forming a cup-shaped end portion on the material as the composite is formed. Further, the temperature of both materials may be kept below the eutectic, with the temperatures of the wires being varied to control the contour of the layer.

As will become apparent as the description proceeds, the joining of the wires takes place at a centrally located work station having a support means, or a die, the diameter of which is only slightly larger than the diameter of the wires. The head is then formed outside the die. Thus there is substantially no displacement of the metals at the joint, and a more uniform contact layer is achieved. Also, as will become apparent, high mass production rates with good quality contacts are achieved by performing all of the operations at a central work station with the materials being forced into the station and joined by a single application of pressure, such pressure being rapidly applied as an impact stroke. Prior art means and methods, whereby different functions are performed at different stations with the machine indexing from station to station, are for the most part slower and in addition, alignment of the materials was difficult to achieve thus causing production problems.

Referring now to the drawing, there is shown valve means 237 of FIG. 15 of the above-noted parent application Ser. No. 786,971 which gives accurate control of the volume of the hydraulic fluid being sent to the element of the machine which it is energizing. In the present machine, such element is the ram means 232 described in the above-noted parent application where such volume control is required. Valve means 237 includes a housing 239 having disposed therein a cavity 241 for piston 242, fluid conduits 243, 244 and 245, piston means 246 having extended therefrom valve stem 247 which is biased against valve seat 248. A piston means 242' is connected to piston 242 and is biased by being exposed to atmospheric pressure. Conduit 244 is in parallel with cavity 241 and serves as a by-pass for the fluid when the fluid is returning or when the limiting effect of piston 242 is no longer required. The travel of piston 242 is determined by stop means 249, the position of which is set by set screw 251 with the set position being maintained by set screw 252.

As previously noted, the present valve is used to accurately control the volume of the fluid disposed. Such control is achieved by the use of the parallel circuit of the conduit 244 and cavity 241. With the valve in the position shown, there is fluid in conduit 243, conduit 244 and in cavity 241 above the piston 242. Valve stem 247 will be seated in valve seat 248 by fluid pressure being applied against piston 246 through inlet means 253. Such fluid could, for example, be fed from another element of the machine in accordance with a programmed sequence. For example, in the present use of the valve where the valve is being used to control the volume of fluid to the ram means, the fluid coming to inlet 253 could be taken from the cutter means 222 of FIG. 21 of the above-noted parent application. There will also be fluid in conduit 245, the fluid being fed to inlet means 254 from actuator means 202 of FIG. 20. When actuator means 202 of FIG. 20 is actuated fluid flows to piston 242 moving the piston against stop means 249 to force fluid from conduit 243 to the ram means through outlet 255. When the volume of fluid through the ram means is no longer required, the pressure against piston 246 is released. Prior to, simultaneously or after, actuator means 202 of FIG. 20 of the above-noted application, releases the pressure to inlet 254 such that there will be less pressure in conduits 244 and 245. Residual fluid pressure of the system will be higher than atmospheric. The cross sectional area of the top of piston 242 less the cross sectional area of the bottom of piston 242 being equal to the cross sectional area of piston 242', and as the fluid pressure inside cavity 241 and conduit 245 is greater than the pressure below piston 242', the piston 242 will return to its "at rest" position and fluid will flow through conduit 244 and 245 such that the fluid system falls to the residual fluid pressure and thus be ready for the next stroke of the ram. By using the parallel connection of the cavity 241 and conduit 244, the system can always be neutralized regardless of the positioning of the stop means 249.

I claim:
1. A fluid monitoring unit comprising
a. a housing,
b. a cavity in said housing,
c. a first piston operable within said cavity,
d. means limiting the travel of said piston,
e. first and second fluid inlets,
f. first and second conduits disposed in spaced, substantially parallel relationship connecting said inlets at opposed ends of said cavity,
g. a third condiut communicating with said first and second conduits,
h. a second cavity communicating with an intersection of one of said first and second conduits and said third conduit,
i. a second piston disposed within said second cavity and operable to engage a valve stem to close said third conduit at said intersection, and
j. fluid inlet means communicating with said second piston.

* * * * *